United States Patent Office 3,428,715
Patented Feb. 18, 1969

3,428,715
HALOGENATED PHOSPHATES AND PHOSPHONATES
Fred William West and John Thomas Gresham, Skillman, and Theodore Weil, Highland Park, N.J., assignors to FMC Corporation, New York, N.Y., a corporation of Delaware
No Drawing. Filed Apr. 19, 1966, Ser. No. 543,543
U.S. Cl. 260—955
Int. Cl. C07f 9/08, 9/28
5 Claims This invention relates to floated control instruments, particularly gyroscopes in which the flotation fluid is a halogenated organophosphorus ester.

In a floated gyroscope the rotor is encased in a float suspended in a fluid, the density of which is chosen to correspond to that of the float. Such an arrangement makes for exceedingly low pivot-friction since the float is supported almost completely by pressure gradients in the fluid. Moreover, the gyro fluid protects the assembly from shock, provides a damping function and serves as a heat transfer medium to dissipate heat developed by the rotor. Where the damping effect on the precession of the float is largely developed by the fluid itself a fluid is generally selected having a high viscosity. However, where damping is not desired or where electronic or orifice damping is employed low viscosity liquids are preferred.

In addition to the above described uses in a single gyroscope, a gyro fluid may be used in a system wherein one or more gyros and associated equipment are mounted on a platform which is floated in the fluid. For this application the fluid is usually a dense, low viscosity liquid.

The liquids which are useful in gyroscopes must have certain critical physical characteristics. High density is required—at least about 1.6 g./ml. The greater the density the more useful the fluid since this permits more inertia to be built into the rotor without imposing higher loads on the pivot. A higher density fluid allows size reduction at the same amount of inertia (and sensitivity of the gyro). A second requirement of such liquids is Newtonian behavior, i.e., the viscosity is independent of the shearing rate. Preferably, the liquid should be relatively insensitive in viscosity to temperature variations. The latter property enables the fluid to remain useful over the operational temperature range of the gyroscope.

Finally, it is essential that the liquid exhibit chemical stability under the operating conditions of the gyroscope since any degradation or breakdown products would very likely cause corrosion of the gyroscope parts.

It is extremely difficult to find a fluid possessing the aforedelineated requirements. Fluids in general use today are based on fluorocarbons because of the known stabilizing effect of large numbers of fluorine atoms on halogenated carbon compounds. The high viscosity fluids are generally telomers of $CFCl=CF_2$ and of $CFBr=CF_2$ having densities in the range of about 1.7 g./ml. to about 2.4 g./ml., respectively. Where low viscosity liquids are required, low molecular weight ends of the telomerization product of the olefins are sometimes employed; a volatile fluorinated cycloether having the empirical $C_8F_{16}O$ and a density of 1.7602 g./ml. at 25° C. is also in common use. Halogenated hydrocarbons other than fluorinated hydrocarbons have proven to be more or less sensitive to hydrolysis and thermal decomposition thereby forming hydrohalic acids and/or free halogens which are highly corrosive to certain metal parts in the gyroscope.

It has now been discovered that certain halogenated organophosphorus esters possess the requisite density for use as a gyroscope fluid and at the same time are remarkably stable and inert. The provision of the aforesaid halogenated organophosphorus esters and their use as gyroscope fluids constitute the principal object and purpose of this invention. Other objects and purposes will be subsequently made manifest.

The halogenated organophosphorus esters suitable for practicing the invention can be depleted by the following formulae:

(I)          $[(XCH_2)_2CHO]_3P=O$ (II)        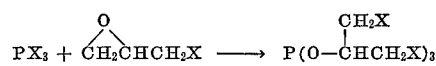

(III)       $(CF_2BrCFBrCH_2O)_3P=O$ (IV)       $[(CXY_2)_2CRO]_3P=O$ (V)        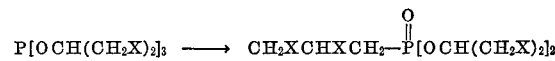

where X is selected from the group consisting of chlorine and bromine; Y is selected from the group consisting of fluorine and hydrogen and R is selected from the group consisting of hydrogen, $—CF_3$ and $—CFBrCF_2Br$.

Phosphate esters of the type represented by Formula I are known chemical entities the description and preparation of which can be found in the technical literature. They are commonly made by reacting phosphorus oxybromide or phosphorus oxychloride with epibromohydrin or epichlorohydrin. Some of these esters are available for sale on the chemical market.

Phosphonate esters conforming to Formula II are described in copending application S.N. 316,423, filed Oct. 15, 1963, in the names of Taylor et al. and assigned to FMC Corporation, now U.S. Patent 3,325,563. The method utilized in synthesizing the esters involves reacting a phosphorus trihalide with an epihalohydrin to form a tris(dihalopropyl) phosphite:

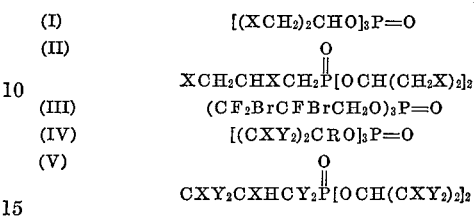

wherein X represents bromine or chlorine. The phosphite intermediate is then isomerized using heat and/or an appropriate catalyst, but preferably by heat alone to form the corresponding bis(dihalopropyl) dihalopropylphosphonate by an intramolecular rearrangement as depicted below:

$$P[OCH(CH_2X)_2]_3 \longrightarrow CH_2XCHXCH_2\overset{O}{\underset{\|}{P}}[OCH(CH_2X)_2]_2$$

Preparation of the phosphite intermediate by reaction of phosphorus trihalide and epihalohydrin is conveniently conducted at temperatures of about 0–105° C. At higher temperatures the phosphite is formed but it is partially isomerized to the phosphonate under these conditions. Catalysts such as titanium tetrachloride may be used, if desired. Solvents may also be employed although they are not necessary nor do they impart any special benefit. Preferably, the reaction is conducted thermally in the absence of catalyst or solvent. Isomerization of the phosphite to the phosphonate takes place at temperatures of about 105–200° C. when no catalyst is employed. Temperatures above about 200° C. should be avoided since they tend to cause degradation of the product. This type of isomerization reaction has been described by D. L. Kenaga et al. in U.S. Patent No. 2,725,311. When a catalyst such as 1% of iodine or methyl iodide is used, temperatures as low as about 70° C. may result in a substantial amount of isomerization.

It has been our experience that optimum yields and purity of the phosphonate are best achieved by conducting the reaction in two separate stages: (1) preparation of the phosphite, (2) isomerization of the phosphite to the phosphonate. The phosphonate is then purified by molecular distillation.

The fluorinated organophosphorus esters containing at least one fluorine atom of Formulae III, IV and V have not been described previously and are accordingly deemed to be patentably new compounds. In the case of the phosphates, these can be realized by reacting the requisite fluorine substituted propanol with a phosphorus oxyhalide such as the chloride or bromide followed by isolation and purification of the resulting fluorinated phosphate ester. In the case of the phosphonate esters these are realized by reacting the appropriate fluorinated propanol in the form of its metal salt with a phosphorus trihalide followed by isomerization of the resulting phosphite ester to the phosphonate ester.

Although the chlorinated and brominated organophosphorus esters of the invention are excellent gyro fluids, even more effective are those organophosphorus esters having fluorine substitution in combination with chlorine and bromine substitution. The resulting class of compounds possess a density range of about 2.1 g./ml. to about 2.5 g./ml., a viscosity range of 200–2200 cp. and are moreover, unusually inert which properties make the fluorinated organophosphorus esters of the invention eminently useful as gyro fluids.

Reference is now made to the following non-limiting examples.

Example 1.—Tris(1,3-dibromo-2-propyl) phosphate

To 85 g. of phosphorus oxybromide, heated to 60° C., three drops of titanium tetrachloride are added. After removal of the heating bath, 125 g. of epibromohydrin are added, with stirring, at a rate such that the pot temperature remains between 70 and 80° C. After the addition has been completed and the exothermic reaction has subsided, the mixture is kept at 60° C. for 3 hours. The volatile parts are stripped under reduced pressure and the residue molecularly distilled, collecting 166 g. of a product of 160° C./0.005 mm. Hg.

Example 2.—Bis(1,3-dibromo-2-propyl) 2,3-dibromopropylphosphonate

A 3-necked flask with two 2-neck adaptors is fitted with a mechanical stirrer, condenser, thermometer, drying tube and two pressure-equilibrated addition funnels. The system is flushed with dry nitrogen.

A small amount of phosphorus tribromide and epibromohydrin in a volume ratio of 1:3 is introduced into the flask and heating started. A certain volume seems to be needed until the reaction starts to be exothermic, but care has to be taken while adding the reactants not to accumulate too much before the reaction has fully started. Should the reaction set in violently, it should not be cooled more than necessary. Once the reaction has started the temperature is controlled by a bath kept at 60° C. and the reagents are added in the same ratio at a rapid rate. After the addition has been completed, the reaction usually stays exothermic for some time. One kilogram can be made in about two hours.

The phosphite is rearranged to the phosphonate using a continuous reactor consisting of a coil of glass tubing immersed in tetrachloroethane heated to a gentle reflux. The phosphite is introduced into the reactor at such a rate that a vigorous reflux of tetrachloroethane takes place, but so that the out flowing product is not giving off heat of reaction. Usually from 50–75% of the phosphite is rearranged in this step. Rearrangement is completed by heating the above product for 48 hours at 100° C./0.01 mm. under a nitrogen stream being passed through the stirred mixture. After this step rearrangement is complete, no phosphite remains, and the product has been stripped. The crude product contains 80–85% phosphonate. The ester is purified by careful molecular distillation at 150° C./10μ.

Example 3.—Tris(2,3-dibromo-2,3,3-trifluoropropyl) phosphate

Three moles of the sodium salt of 2,3-dibromo-2,3,3-trifluoropropanol is mixed with 1 mole of phosphorus oxychloride in ether keeping the temperature well below 0° C. The reaction mixture is stirred for several hours below 0° C. and then allowed to slowly warm up to room temperature. Any excess base is neutralized and the phosphate ester then isolated. The crude product is carefully distilled on a falling film molecular still at 1–10 microns and 140° C.

The 2,3-dibromo-2,3,3-trifluoropropanol was prepared by a method as follows. To a solution of perfluorovinyl magnesium iodide (prepared by a method similar to Knunyants C.A. 53, 6987 g.) in ether solvent is added gaseous formaldehyde at −25° C. After the addition, the mixture is stirred at −25° C. to −20° C. for one hour and then slowly allowed to come to room temperature. The alcohol is isolated and brominated with excess bromine in chloroform. Unreacted bromine is removed by washing with aqueous sodium thiosulfate. The brominated alcohol is purified by distillation.

Example 4.—Tris[2,3-dibromo-1,1-di(chlorodifluoromethyl)-2,3,3-trifluoropropyl] phosphate Three moles of the sodium salt of 2,3-dibromo-1,1-di(chlorodifluoromethyl)-2,3,3-trifluoropropanol are reacted with 1 mole of phosphorus oxychloride in ether at 0° C. The resulting mixture is stirred several hours below 0° C. and then allowed to slowly warm up to room temperature. The crude phosphate ester is separated and purified by distillation in a falling film molecular still.

The 2,3 - dibromo - 1,1-di(chlorodifluoromethyl)-2,3,3-trifluoropropanol is prepared in the following manner: To a stirred solution of perfluorovinylmagnesium bromide in tetrahydrofuran at −15° C. sym-dichlorotetrafluoroacetone is added dropwise. After the addition, the mixture is stirred for about an hour at 0° C., allowed to warm up to room temperature and then hydrolyzed with dilute hydrochloric acid. The ether layer is separated and dried over magnesium sulfate. After removing the ether under reduced pressure, the alcohol, which is in a 1:2 complex with tetrahydrofuran, is freed by adding 20% oleum followed by distillation under reduced pressure. The purified product boils at 55° C./22 mm. The unsaturated alcohol is then brominated with a slight excess of bromine using chloroform as the solvent. The chloroform solution is washed with sodium thiosulfate to remove excess bromine. The chloroform solution is dried, evaporated and the resulting crude 2,3-dibromo-1,1-di(chlorodifluoromethyl)-2,3,3-trifluoropropanol purified by distillation.

Example 5.—Tris(1,3-dibromo-1,1,3,3-tetrafluoro-2-propyl)phosphate

This compound is prepared by reacting 3 moles of 1,3-dibromo-1,1,3,3-tetrafluoro-2-propanol with 1 mole of phosphorus oxychloride using the procedures set forth in the preceding examples. The halogenated phosphate ester is purified on a falling film molecular still.

The intermediate 1,3 - dibromo - 1,1,3,3 - tetrafluoro-2-propanol is obtained by the following series of reactions:

3-bromo-1,1,3,3-tetrafluoropropene, 1.2 moles (prepared by the method of Tarrant, Lovelace and Lilyquist, J.A.C.S., 77, 2783 (1955)), dibromodifluoromethane, 5.2 moles, and benzoyl peroxide, 0.02 mole, are heated and shaken in a stainless steel autoclave for 5 hours at 100° C. The autoclave is cooled to about 10° C. and the excess dibromodifluoromethane removed after which the residual material is distilled into two portions. The lower boiling portion is refluxed 5 hours with a solution of 140 g. of potassium hydroxide in 150 ml. of water. The fluorocarbon layer is separated and distilled collecting the material boiling below 95° C.

The distillate (21 g.) is reacted with 18 g. of potassium permanganate and 25 ml. of water at 100° C. in an autoclave for 4 to 5 hours. The reaction mixture is extracted several times with ether. The extracts are dried and the ether is removed by distillation. The residue is distilled from $P_2O_5$, collecting the material boiling from 75° to 95° C. This fraction contains the desired ketone, sym-dibromotetrafluoroacetone.

The aforedescribed ketone is reduced to 1,3-dibromo-1,1,3,3-tetrafluoro-2-propanol using lithiumaluminumhydride after the procedure described for sym-dichlorotetrafluoroacetone (Middletone and Lindsey, J.A.C.S., 86, 4948 (1964)).

Example 6.—Bis(1,3 - dibromo - 1,1,3,3-tetrafluoro-2-propyl) 2,3-dibromo-1,1,3,3-tetrafluoropropylphosphonate Three moles of the sodium salt of 1,3-dibromo-1,1,3,3-tetrafluoro-2-propanol are reacted with 1 mole of phosphorus trichloride using the procedure given for the preparation of the phosphate esters of the previous examples. The phosphite ester which is the initial product is rearranged to the desired phosphonate ester under conditions similar to those already described. The phosphonate ester is purified by molecular distillation.

As will be apparent to those skilled in the art, numerous modifications and variations of the formulation of the gyro flotation fluids illustrated above may be made without departing from the spirit of this invention or the scope of the following claims.

What is claimed is:

1. A halogenated organophosphorus ester having at least one fluorine atom selected from the class consisting of $(CF_2BrCFBrCH_2O)_3P=O$, $[(CXY_2)_2CRO]_3P=O$ and

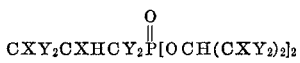

wherein X is selected from the class consisting of chlorine and bromine, Y is selected from the class consisting of fluorine and hydrogen, and R is selected from the group consisting of hydrogen, —$CF_3$ and —$CFBrCF_2Br$.

2. A halogenated organophosphorus ester of claim 1 wherein the ester is tris(2,3-dibromo-2,3,3-trifluoropropyl) phosphate.

3. A halogenated organophosphorus ester of claim 1 wherein the ester is tris(2,3-dibromo-1,1-di(chlorodifluoromethyl)-2,3,3-trifluoropropyl) phosphate.

4. A halogenated organophosphorus ester of claim 1 wherein the ester is tris(1,3-dibromo-1,1,3,3-tetrafluoro-2-propyl) phosphate.

5. A halogenated organophosphorus ester of claim 1 wherein the ester is bis(1,3-dibromo-1,1,3,3-tetrafluoro-2 - propyl) - 2,3-dibromo-1,1,3,3-tetrafluoropropylphosphonate.

References Cited

UNITED STATES PATENTS 2,727,058  12/1955  Conly _____ 260—955 XR

CHARLES B. PARKER, *Primary Examiner.*

ANTON H. SUTTO, *Assistant Examiner.*

U.S. Cl. X.R.

74—5; 252—77; 260—977, 969, 633, 593